United States Patent
Bellows et al.

(10) Patent No.: US 8,462,053 B2
(45) Date of Patent: Jun. 11, 2013

(54) SYSTEMS AND METHODS FOR SETTING A MULTI-BAND ANTENNA BASED ON LOCATION

(75) Inventors: David Bellows, Wantagh, NY (US); Rehan Jaffri, New York, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 583 days.

(21) Appl. No.: 12/701,641

(22) Filed: Feb. 8, 2010

(65) Prior Publication Data

US 2011/0193750 A1  Aug. 11, 2011

(51) Int. Cl.
*H01Q 1/24* (2006.01)

(52) U.S. Cl.
USPC ............................................ 343/702; 455/75

(58) Field of Classification Search
USPC ..................... 343/702, 850; 455/75
See application file for complete search history.

(56) References Cited

U.S. PATENT DOCUMENTS

| | | | |
|---|---|---|---|
| 8,131,232 B2 * | 3/2012 | Muhammad | 455/114.2 |
| 2003/0003922 A1 | 1/2003 | McClure | |
| 2003/0064731 A1 | 4/2003 | Angelo et al. | |
| 2009/0286557 A1 * | 11/2009 | Clipsham | 455/457 |
| 2011/0014879 A1 * | 1/2011 | Alberth et al. | 455/75 |

FOREIGN PATENT DOCUMENTS

EP  1037482 A2  9/2000

OTHER PUBLICATIONS

International Search Report and Written Opinion mailed on Feb. 17, 2011 for International Application No. PCT/US2010/060178.
Songnan Yang et al.: "Frequency-Reconfigurable Antennas for Multiradio Wireless Platforms", IEEE Microwave Magazine, IEEE Service Center, Piscataway, NJ, US, vol. 9, No. 1, Feb. 1, 2009, pp. 66-83.
Rule 161 communication dated Oct. 18, 2012 in related European application 10795552.8.

* cited by examiner

*Primary Examiner* — Hoanganh Le

(57) ABSTRACT

The present disclosure includes systems and methods for setting a multi-band tunable antenna, a quad-band antenna, or the like based on location information. Specifically, the present invention may include a mobile computing device, circuitry connected to an antenna, an operational method, and the like where location data is used to set operating frequencies and other parameters in the antenna. The location data may be provided from a wireless base station, from a global position system (GPS), or the like. Advantageously, the present invention simplifies antenna design and operation, allowing use of a tunable dual-band antenna in lieu of conventional quad-band antennas. Further, the present invention includes automated systems and methods for tuning the multi-band tunable antenna without requiring user input.

16 Claims, 3 Drawing Sheets

SYSTEMS AND METHODS FOR SETTING A MULTI-BAND ANTENNA BASED ON LOCATION

FIELD OF THE INVENTION

The present invention relates generally to wireless communications. More particularly, the present invention relates to systems and methods for setting operational parameters of a multi-band antenna based on location information such as from a global positioning satellite (GPS) receiver, mobile base station, or the like.

BACKGROUND OF THE INVENTION

Wireless, mobile computing devices are proliferating. Exemplary devices include cell phones, smart phones, laptops with wireless adaptors, personal digital assistants, tablet computers, netbooks, and the like. For coverage across the world, these devices typically include a quad-band WAN antenna that operates in four frequency bands, two of which are only used in North America (850 MHz and 1900 MHz) and the other two are only used in Europe/Asia Pacific (900 MHz and 1800 MHz). As mobile computing products get smaller and the need for additional antennas increases, the engineering challenge of satisfying all the desired antenna requirements gets more and more difficult. In particular, wireless enabled devices at minimum are being designed to meet the 850 MHz, 900 MHz, 1800 MHz, and 1900 MHz frequency bands. In the limited volume available, this is always a challenge, especially at the lower frequency bands where the wavelength is longer. Anything that could be done to simplify the antenna would result in an improved system solution.

BRIEF SUMMARY OF THE INVENTION

In an exemplary embodiment of the present invention, a system includes an antenna with adjustable operating parameters; a location determination mechanism; and circuitry connected to the antenna and the location determination mechanism, wherein the circuitry is configured to set the adjustable operating parameters based on a location from the location determination mechanism. The adjustable operating parameters may include operating frequencies. Optionally, the antenna may include a quad-band antenna connected to a radio system operating in a 850 MHz band, a 900 MHz band, a 1800 MHz band, and a 1900 MHz band. The circuitry may be configured to operate the radio system in the 850 MHz band and the 1900 MHz band responsive to the location being in North America, and the circuitry may be configured to operate the radio system in the 900 MHz band and the 1800 MHz band responsive to the location being in Europe or Asia Pacific. Alternatively, the antenna may include a tunable antenna configured to be tuned to particular operating frequencies by the circuitry. The tunable antenna may be connected to digitally tunable capacitors configured to shift resonant frequencies of the tunable antenna responsive to settings on the digitally tunable capacitors. The tunable antenna may be configured to operate in a 850 MHz band, a 900 MHz band, a 1800 MHz band, and a 1900 MHz band. The circuitry may be configured to operate the tunable antenna in the 850 MHz band and the 1900 MHz band responsive to the location being in North America, and the circuitry may be configured to operate the tunable antenna in the 900 MHz band and the 1800 MHz band responsive to the location being in Europe or Asia Pacific. The adjustable operating parameters may include an additional parameter in addition to the operating frequencies. Optionally, the location determination mechanism may include a global positioning satellite receiver and system. Alternatively, the location determination mechanism may be configured to perform triangulation based on received signals. The circuitry may be configured to set the adjustable operating parameters based on a location from the location determination mechanism automatically and without user intervention.

In another exemplary embodiment of the present invention, a mobile device includes a wireless radio including an antenna with adjustable operating settings; a location determination device; and a processor coupled to memory, the wireless radio, and the location determination device; wherein the processor is configured to: receive a location from the location determination device; and set the adjustable operating settings based upon the location. The memory may include settings based upon a plurality of locations, and wherein the processor may be configured to select appropriate settings based on the location. The adjustable operating settings may include operating frequencies. Optionally, the antenna may include a quad-band antenna connected to a radio system operating in a 850 MHz band, a 900 MHz band, a 1800 MHz band, and a 1900 MHz band; and the processor may be configured to set the radio system in the 850 MHz band and the 1900 MHz band responsive to the location being in North America, and the processor may be configured to set the radio system in the 900 MHz band and the 1800 MHz band responsive to the location being in Europe or Asia Pacific. Alternatively, the antenna may include a tunable antenna configured to be tuned to particular operating frequencies by the circuitry; the tunable antenna may be connected to digitally tunable capacitors configured to shift resonant frequencies of the tunable antenna responsive to settings on the digitally tunable capacitors; the tunable antenna may be configured to operate in a 850 MHz band, a 900 MHz band, a 1800 MHz band, and a 1900 MHz band; and the circuitry may be configured to operate the tunable antenna in the 850 MHz band and the 1900 MHz band responsive to the location being in North America, and the circuitry may be configured to operate the tunable antenna in the 900 MHz band and the 1800 MHz band responsive to the location being in Europe or Asia Pacific. The location determination device may include a global positioning satellite receiver and system. The processor may be configured to set the adjustable operating settings based on a location from the location determination device automatically and without user intervention.

In yet another exemplary embodiment of the present invention, a method includes providing a device including an adjustable antenna; automatically determining a location of the device based upon circuitry in the device; setting the adjustable antenna based on the determined location, wherein setting the adjustable antenna at least includes setting operational frequencies of the antenna; and operating the device.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention includes systems and methods for setting a multi-band tunable antenna, a quad-band antenna, or the like based on location information. Specifically, the present invention may include a mobile computing device, circuitry connected to an antenna, an operational method, and the like where location data is used to set operating frequencies in the antenna. The location data may be provided from a wireless base station, from a global position system (GPS), or the like. Advantageously, the present invention simplifies antenna design and operation, allowing use of a tunable dual-band antenna in lieu of conventional quad-band antennas. Further, the present invention includes automated systems and methods for tuning the multi-band tunable antenna without requiring user input.

Figure 1:
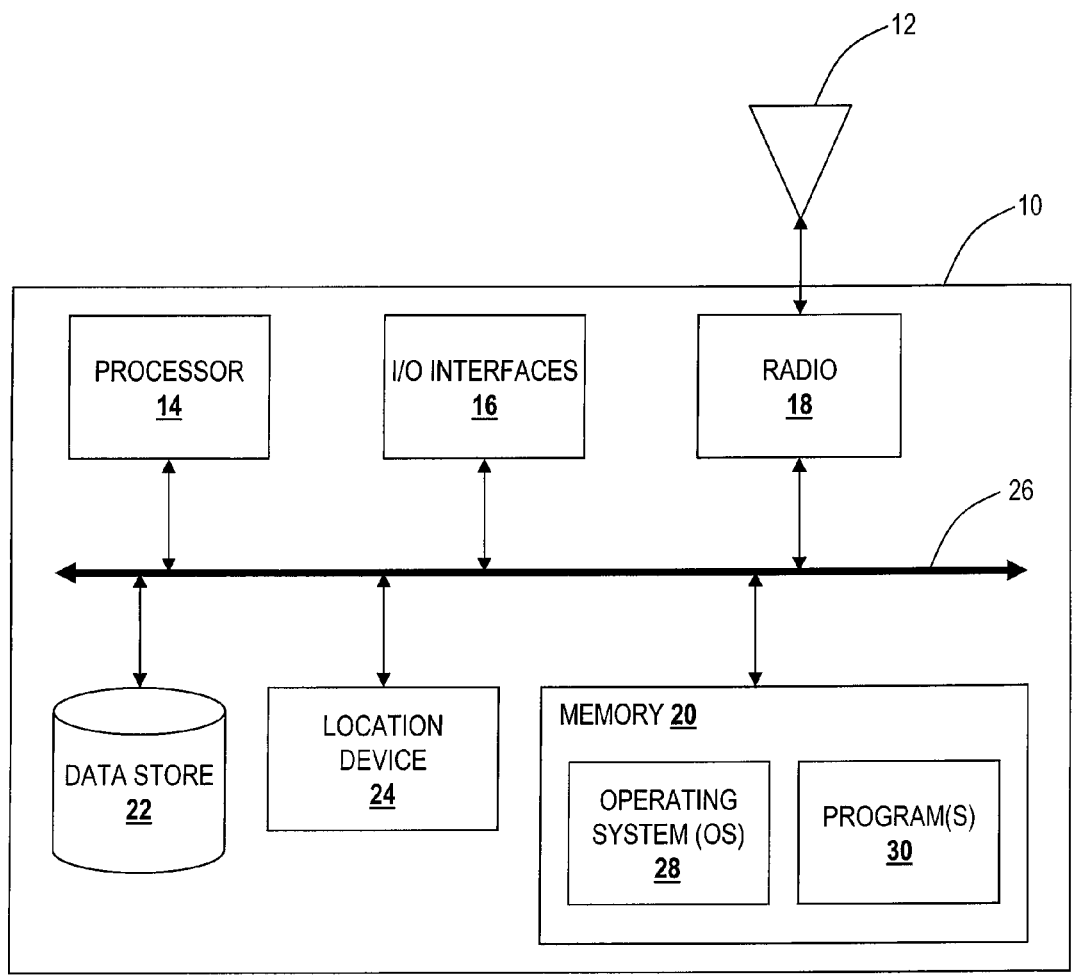
FIG. 1 is a block diagram of a mobile computing device with a multi-band antenna that is automatically set based on information from a location determination device.

Referring to FIG. 1, in an exemplary embodiment, the present invention includes a mobile computing device 10 with a multi-band antenna 12. The mobile computing device 10 may include a cell phone, smart phone, PDA, laptop computer with wireless adaptor, or the like. The mobile computing device 10 may be a digital device that, in terms of hardware architecture, generally includes a processor 14, input/output (I/O) interfaces 16, a radio 18 connected to the multi-band antenna 12, memory 20, a data store 22, and a location determination device 24. It should be appreciated by those of ordinary skill in the art that FIG. 1 depicts the mobile computing device 10 in an oversimplified manner, and a practical embodiment may include additional components and suitably configured processing logic to support known or conventional operating features that are not described in detail herein. The components (12, 14, 16, 18, 20, 22, and 24) are communicatively coupled via a local interface 26. The local interface 26 may be, for example but not limited to, one or more buses or other wired or wireless connections, as is known in the art. The local interface 26 can have additional elements, which are omitted for simplicity, such as controllers, buffers (caches), drivers, repeaters, and receivers, among many others, to enable communications. Further, the local interface 26 may include address, control, and/or data connections to enable appropriate communications among the aforementioned components.

The processor 14 is a hardware device for executing software instructions. The processor 14 can be any custom made or commercially available processor, a central processing unit (CPU), an auxiliary processor among several processors associated with the mobile computing device 10, a semiconductor-based microprocessor (in the form of a microchip or chip set), a digital signal processor, application specific integrated circuit, field programmable gate array, or generally any device for executing software instructions. When the mobile computing device 10 is in operation, the processor 14 is configured to execute software stored within the memory 20, to communicate data to and from the memory 20, and to generally control operations of the mobile computing device 10 pursuant to the software instructions. The I/O interfaces 16 may be used to receive user input from and/or for providing system output to one or more devices or components. User input may be provided via, for example, a keyboard, a keypad, a mouse, a scroll bar, buttons, bar code scanner, touch screen, and the like. System output may be provided via a display device such as a liquid crystal display (LCD), and the like. The I/O interfaces 16 may also include, for example, a serial port, a parallel port, a small computer system interface (SCSI), an infrared (IR) interface, a radio frequency (RF) interface, and/or a universal serial bus (USB) interface. The I/O interfaces 16 may include a graphical user interface (GUI) that enables a user to interact with the mobile device 10. Additionally, the I/O interfaces 16 may further include an imaging device, i.e. camera, video camera, etc.

The radio 18 includes RF circuitry and logic configured to interface with the multi-band tunable antenna 12 to enable wireless communication to an external access device or network. Any number of suitable wireless data communication protocols, techniques, or methodologies may be supported by the radio 18, including, without limitation: RF; IrDA (infrared); Bluetooth; ZigBee (and other variants of the IEEE 802.15 protocol); IEEE 802.11 (any variation); IEEE 802.16 (WiMAX or any other variation); Universal Mobile Telecommunications System (UMTS); Code Division Multiple Access (CDMA) including all variants; Global System for Mobile Communications (GSM) and all variants; Time division multiple access (TDMA) and all variants; Direct Sequence Spread Spectrum; Frequency Hopping Spread Spectrum; wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. The data store 22 can be used to store data. The data store 22 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 22 may incorporate electronic, magnetic, optical, and/or other types of storage media.

The memory 20 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 20 may incorporate electronic, magnetic, optical, and/or other types of storage media. Note that the memory 20 may have a distributed architecture, where various components are situated remotely from one another, but can be accessed by the processor 14. The software in memory 20 may include one or more software programs, each of which includes an ordered listing of executable instructions for implementing logical functions. In the example of FIG. 1, the software in the memory 20 system includes a suitable operating system (O/S) 28 and programs 30. The operating system 28 essentially controls the execution of other computer programs, and provides scheduling, input-output control, file and data management, memory management, and communication control and related services. The operating system 28 can be any of LINUX (or another UNIX variant), Android (available from Google), Symbian OS, Microsoft Windows, iPhone OS (available from Apple, Inc.), Palm OS, Blackberry OS, and the like. The programs 30 can include various applications configured to run on the mobile computing device 10.

The mobile computing device 10 further includes the location determination device 24 to determine a location in real-time of the device 10. In one exemplary embodiment, the location determination device 24 may include a GPS receiver, a GPS antenna, and associated circuitry, software, etc. to perform location determination using GPS satellites. For example, the location determination may include receiving signals from a plurality of different GPS satellites and performing triangulation to determine the location. Of note, most new mobile phones are typically offered with GPS receivers, and these devices 10 may include various software programs 30 utilizing the location information, e.g. real-time mapping, direction, look up services, etc. In another exemplary embodiment, the location determination device 24 may include circuitry, software, etc. to perform triangulation based on signals picked up from different mobile base stations. Here, the location determination device 24 performs a similar analysis as the GPS receiver, but uses the signals from the base stations instead of signals from GPS satellites. In other exemplary embodiments, the location determination device 24 may simply receive a signal from mobile base stations alerting the device 10 as to its general location. Note, the mobile computing device 10 may further include a plurality of additional antennas in addition to the antenna 12. For example, the location determination device 24 may include a GPS antenna. Also, the mobile computing device 10 may include a wireless local area networking (WLAN) antenna as well. In one exemplary embodiment, all of these antennas may be connected to the radio 18 with the radio 18 including various components and circuits to work with each of the antennas. In another exemplary embodiment, the GPS antenna may be connected directly to the location determination device 24 with the location determination device 24 including GPS circuitry.

In various exemplary embodiments, the mobile computing device 10 is configured to adaptively set the multi-band antenna 12 based on information from the location determination device 24. Specifically, the mobile computing device 10 may include one or more programs 30 configured to receive location data from the location determination device 24, and to set operational parameters on the multi-band antenna 12 and the radio 16 based on the location data. For example, the memory 20 and/or data store 22 may include various operational parameters for the multi-band antenna 12 that are preloaded. Exemplary operational parameters may include frequency operating ranges, RF power, and the like.

Figure 2:
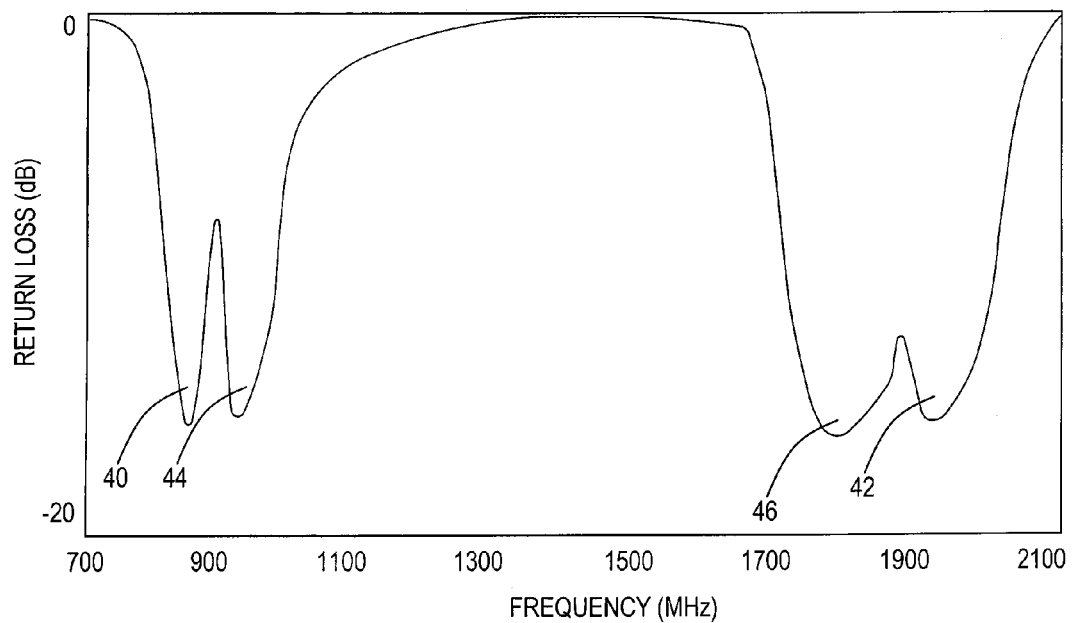
FIG. 2 is a return loss graph of a quad-band antenna for use with the mobile computing device of FIG. 1.
Figure 3:
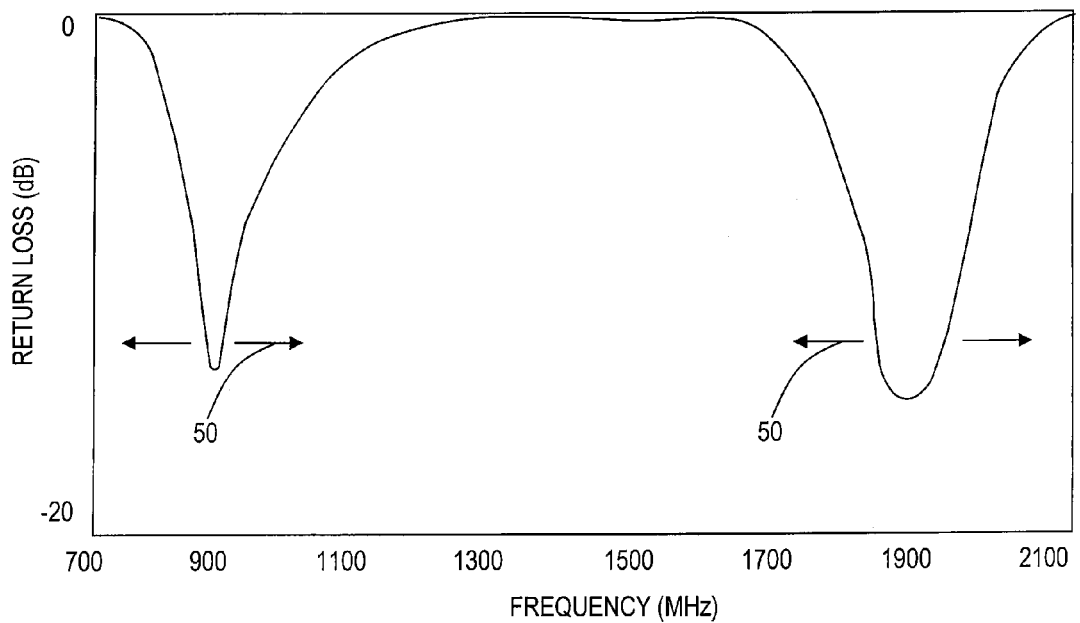
FIG. 3 is a return loss graph of a dual-band tunable antenna for use with the mobile computing device of FIG. 1.

Referring to FIGS. 2 and 3, in exemplary embodiments, return loss diagrams are illustrated for various multi-band antennas 12 utilized with the mobile computing device 10. FIG. 2 illustrates a quad-band antenna and FIG. 3 illustrates a dual-band tunable antenna. These antennas 12 require different bands based on different operating frequencies in North America, Europe, and Asia Pacific. For example, North America only uses the 850 MHz and 1900 MHz bands (denoted by reference numerals 40, 42), and Europe and Asia Pacific only use the 900 MHz and 1800 MHz bands (denoted by reference numerals 44, 46). Note, the 850 MHz and 900 MHz bands will never be used at the same time, and the 1800 MHz and the 1900 MHz bands also will never be used at the same time. The dual-band tunable antenna in FIG. 3 is configured to dynamically tune (denoted by reference numeral 50) to either of the 850 MHz and 900 MHz bands and the 1800 MHz and the 1900 MHz bands.

Referring back to FIG. 1, in an exemplary embodiment, the mobile computing device 10 is configured to operate the multi-band antenna 12 based on data from the location determination device 24. For example, the mobile computing device 10 may include logic as part of the operating system 28 and/or a separate program 30 that keeps track of the operating location of the mobile computing device 10. Further, this logic may be configured to set operating parameters responsive to the operating location. For example, if the multi-band antenna 12 includes a quad-band antenna such as illustrated in FIG. 2, the logic may be configured to either operate in the 850 MHz and 1900 MHz bands or the 900 MHz and 1800 MHz bands based on the operating location. The logic may further include predetermined parameters used to determine which bands to operate in. For example, assume the operating location from the location determination device 24 is determined to be in North America, then the logic may direct the quad-band antenna to operate in the 850 MHz and 1900 MHz bands. Advantageously, a user is not required to set the network or operating parameters, rather the mobile computing device 10 automatically operates based on the location.

In another exemplary embodiment, the multi-band antenna 12 includes a tunable dual-band antenna such as illustrated in FIG. 3. There is no need to design an antenna that is capable of transmitting or receiving in all four bands simultaneously. Many conventional designs utilize a quad-band design (FIG. 2) that is configured to operate in different bands at different times. Advantageously, utilizing a tunable dual-band antenna significantly reduces antenna design and operation requirements, i.e. it is easier to design and operate a dual-band antenna than a quad-band antenna. In addition to providing a tunable dual-band antenna to cover the same frequencies as a quad-band antenna, the present invention utilizes the location determination device 24 to automatically set the appropriate bands in the tunable dual-band antenna. This dynamic tuning of the dual-band antenna is based on input from the location determination device 24, and not based on manual user input or settings.

The present invention contemplates use with any tunable multi-band antenna. For example, using commercially available digitally tunable capacitors, the resonant frequencies of an antenna can be shifted. Therefore, instead of building a more complicated and potentially larger structure to resonate four frequency bands simultaneously, e.g. a quad-band antenna as illustrated in FIG. 2, a simpler antenna that resonates at two frequency bands (e.g. approximately 875 MHz and approximately 1850 MHz) can be designed instead. Also, the location determination device 24 can determine its physical location and then tune the dual-band antenna to the frequencies used in that part of the world, e.g. based on preloaded settings in the mobile computing device 10 such as in the memory 20 or data store 22.

Figure 4:
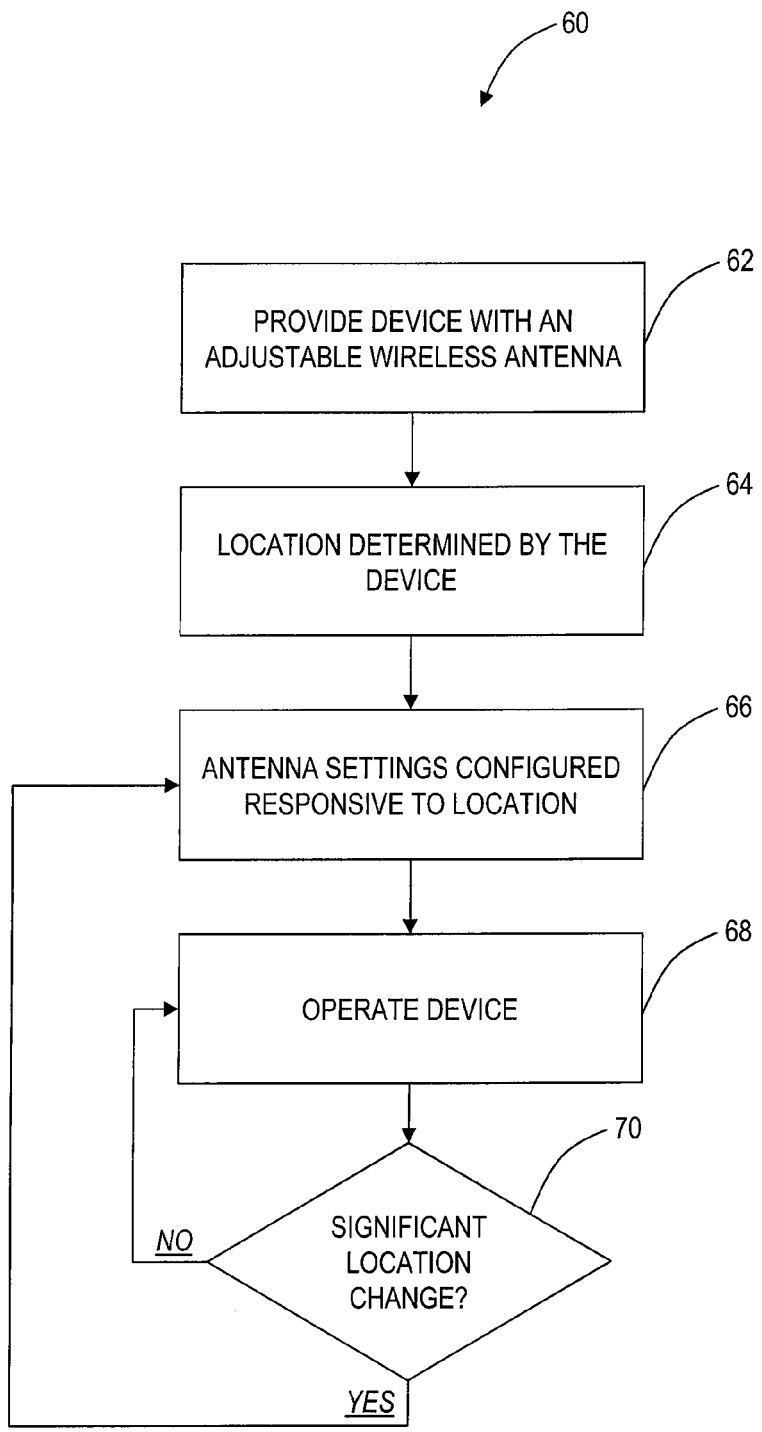
FIG. 4 is a flowchart of an operational method using real-time location information to adjust and set an antenna associated with a mobile, wireless device.

Referring to FIG. 4, in an exemplary embodiment, a flowchart of an operational method 60 using real-time location information to adjust and set an antenna associated with a mobile, wireless device is illustrated. The operational method 60 may be implemented with any wireless device with an adjustable antenna (step 62). This may include the mobile computing device 10 illustrated herein as well as any other device using an antenna that is configured to operate in multiple frequencies or that may be tuned or set to operate in multiple frequencies. The device is able to determine its location (step 64). The present invention contemplates any real-time location determination method, such as GPS, triangulation from known sources, and the like. The device is configured to set operational parameters of an antenna based on the location (step 66). The operational parameters may include operating frequencies, power, protocols, and the like. Once the operational parameters are set, the device may operate (step 68). Throughout operation, the location of the device may change and the device may be configured to detect a significant location change (step 70). A significant location change may include one where the operational parameters of the antenna need to be adjusted. For example, moving from North America to Europe or Asia Pacific. Alternatively, the significant location change may also be changing from a CDMA provider to a GSM provider requiring different radio settings. If there is a significant location change, the device may readjust the antenna settings based on the new location (step 66). In another embodiment, step 70 is omitted and the operational method 60 may operate only once responsive to turning on the mobile device 10, and repeat only after the mobile device 10 is powered down and then powered up.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A system, comprising:
a tunable antenna with adjustable operating parameters comprising operating frequencies and power;
a location determination mechanism; and
circuitry connected to the tunable antenna and the location determination mechanism, wherein the circuitry is configured to tune the tunable antenna to particular operating frequencies by shifting resonant frequencies of the tunable antenna and set the power based on a location from the location determination mechanism.

2. The system of claim 1, wherein the tuning operates only once responsive to turning on the system, and repeat only after the system is powered down and then powered up.

3. The system of claim 1, wherein the antenna comprises a quad-band antenna connected to a radio system operating in a 850 MHz band, a 900 MHz band, a 1800 MHz band, and a 1900 MHz band.

4. The system of claim 3, wherein the circuitry is configured to operate the radio system in the 850 MHz band and the 1900 MHz band responsive to the location being in North America, and the circuitry is configured to operate the radio system in the 900 MHz band and the 1800 MHz band responsive to the location being in Europe or Asia Pacific.

5. The system of claim 1, wherein the tunable antenna is connected to digitally tunable capacitors configured to shift the resonant frequencies of the tunable antenna responsive to settings on the digitally tunable capacitors.

6. The system of claim 1, wherein the adjustable operating parameters also comprise an operating protocol in addition to the operating frequencies.

7. The system of claim 1, wherein the location determination mechanism comprises a global positioning satellite receiver and system.

8. The system of claim 1, wherein the location determination mechanism is configured to perform triangulation based on received signals.

9. The system of claim 1, wherein the circuitry is configured to tune the power and tune the tunable antenna to particular operating frequencies based on a location from the location determination mechanism automatically and without user intervention.

10. A mobile device, comprising:
a wireless radio comprising tunable power and a tunable antenna with adjustable operating settings comprising operating frequencies;
a location determination device; and
a processor coupled to memory, the wireless radio, and the location determination device;
wherein the processor is configured to:
receive a location from the location determination device; and
tune the tunable antenna to particular operating frequencies by shifting resonant frequencies of the tunable antenna and set the power based upon the location.

11. The mobile device of claim 10, wherein the memory comprises settings based upon a plurality of locations, and wherein the processor is configured to select appropriate settings based on the location.

12. The mobile device of claim 11, wherein the antenna comprises a quad-band antenna connected to a radio system operating in a 850 MHz band, a 900 MHz band, a 1800 MHz band, and a 1900 MHz band; and
wherein the processor is configured to set the radio system in the 850 MHz band and the 1900 MHz band responsive to the location being in North America, and the processor is configured to set the radio system in the 900 MHz band and the 1800 MHz band responsive to the location being in Europe or Asia Pacific.

13. The mobile device of claim 11:
wherein the tunable antenna is connected to digitally tunable capacitors configured to shift resonant frequencies of the tunable antenna responsive to settings on the digitally tunable capacitors;
wherein the tunable antenna is configured to operate in a 850 MHz band, a 900 MHz band, a 1800 MHz band, and a 1900 MHz band; and
wherein the circuitry is configured to operate the tunable antenna in the 850 MHz band and the 1900 MHz band responsive to the location being in North America, and the circuitry is configured to operate the tunable antenna in the 900 MHz band and the 1800 MHz band responsive to the location being in Europe or Asia Pacific.

14. The mobile device of claim 10, wherein the location determination device comprises a global positioning satellite receiver and system.

15. The mobile device of claim 10, wherein the processor is configured to set the power and tune the tunable antenna to particular operating frequencies based on a location from the location determination device automatically and without user intervention.

16. A method, comprising:
providing a device comprising an adjustable antenna and power;
automatically determining a location of the device based upon circuitry in the device;
setting the adjustable antenna and power based on the determined location, wherein setting the adjustable antenna at least comprises setting operational frequencies of the antenna by shifting resonant frequencies of the adjustable antenna; and
operating the device.

* * * * *